(12) United States Patent
Jahagirdar et al.

(10) Patent No.: US 7,516,342 B2
(45) Date of Patent: Apr. 7, 2009

(54) METHOD, APPARATUS AND SYSTEM TO DYNAMICALLY CHOOSE AN OPTIMUM POWER STATE

(75) Inventors: Sanjeev Jahagirdar, Folsom, CA (US); Varghese George, Folsom, CA (US); Jose Allarey, Davis, CA (US); Eric Heit, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 11/322,606

(22) Filed: Dec. 30, 2005

(65) Prior Publication Data
US 2007/0157042 A1    Jul. 5, 2007

(51) Int. Cl.
*G06F 1/26* (2006.01)
*G06F 1/00* (2006.01)

(52) U.S. Cl. .................. 713/320; 713/300
(58) Field of Classification Search .......... 713/320
See application file for complete search history.

(56) References Cited

U.S. PATENT DOCUMENTS

| | | | | |
|---|---|---|---|---|
| 5,617,572 A | * | 4/1997 | Pearce et al. | 713/323 |
| 6,748,546 B1 | * | 6/2004 | Mirov et al. | 713/320 |
| 6,829,713 B2 | | 12/2004 | Cooper et al. | |
| 2005/0273663 A1 | * | 12/2005 | Yoon | 714/36 |
| 2006/0288245 A1 | * | 12/2006 | Lee | 713/320 |

OTHER PUBLICATIONS

U.S. Appl. No. 09/751,759; Title—Method and Apparatus for a Zero Voltage Processor Sleep State; filed Dec. 30, 2005; Inventor: Sanjeev Jahagirdar.

* cited by examiner

*Primary Examiner*—Thomas Lee
*Assistant Examiner*—Stefan Stoynov
(74) *Attorney, Agent, or Firm*—Kacvinsky LLC

(57) ABSTRACT

Some embodiments of the invention include an apparatus and method for dynamically choosing an optimum power state. In some embodiments, the optimum power state may be determined from historical information about the various power states that any of the embodiments of the apparatus or a system equipped with embodiments of the apparatus or operating embodiments of the method may encounter. Some embodiments may generate registers to maintain information regarding the various power states. In some embodiments, power management logic may determine the optimum power state based upon this information. Other embodiments are described.

23 Claims, 5 Drawing Sheets

METHOD, APPARATUS AND SYSTEM TO DYNAMICALLY CHOOSE AN OPTIMUM POWER STATE

BACKGROUND

1. Technical Field

Some embodiments of the invention generally relate to the operation of processors. More particularly, some embodiments of the invention relate to dynamic power state selection for processors.

2. Discussion

As the trend toward advanced microprocessors, e.g. central processing units (CPUs), with more transistors and higher frequencies continues to grow, computer designers and manufacturers are often faced with corresponding increases in power and energy consumption. Particularly in mobile devices, increased power consumption can lead to overheating, which may negatively affect performance, and can significantly reduce battery or portable power source life. Because portable power sources typically have a limited capacity, operating the processor of a mobile device more than necessary or at a higher level of activity than necessary could drain the capacity more quickly than desired.

Thus, power consumption continues to be an important issue for computing systems, including desktop computers, laptop computers, wireless handsets, personal digital assistants, etc. In today's computing systems, for example, to address power dissipation concerns, certain components may be placed into lower power states based on reduced activity or demand.

As a result, the application of lower power states and the efficient management of the processes for entering and exiting these states has become an increasingly significant area of interest for the management of power consumption.

BRIEF DESCRIPTION OF THE DRAWINGS

Various advantages of embodiments of the invention will become apparent to one skilled in the art by reading the following specification and appended claims, and by referencing the following drawings, in which:

DETAILED DESCRIPTION

Figure 1A:
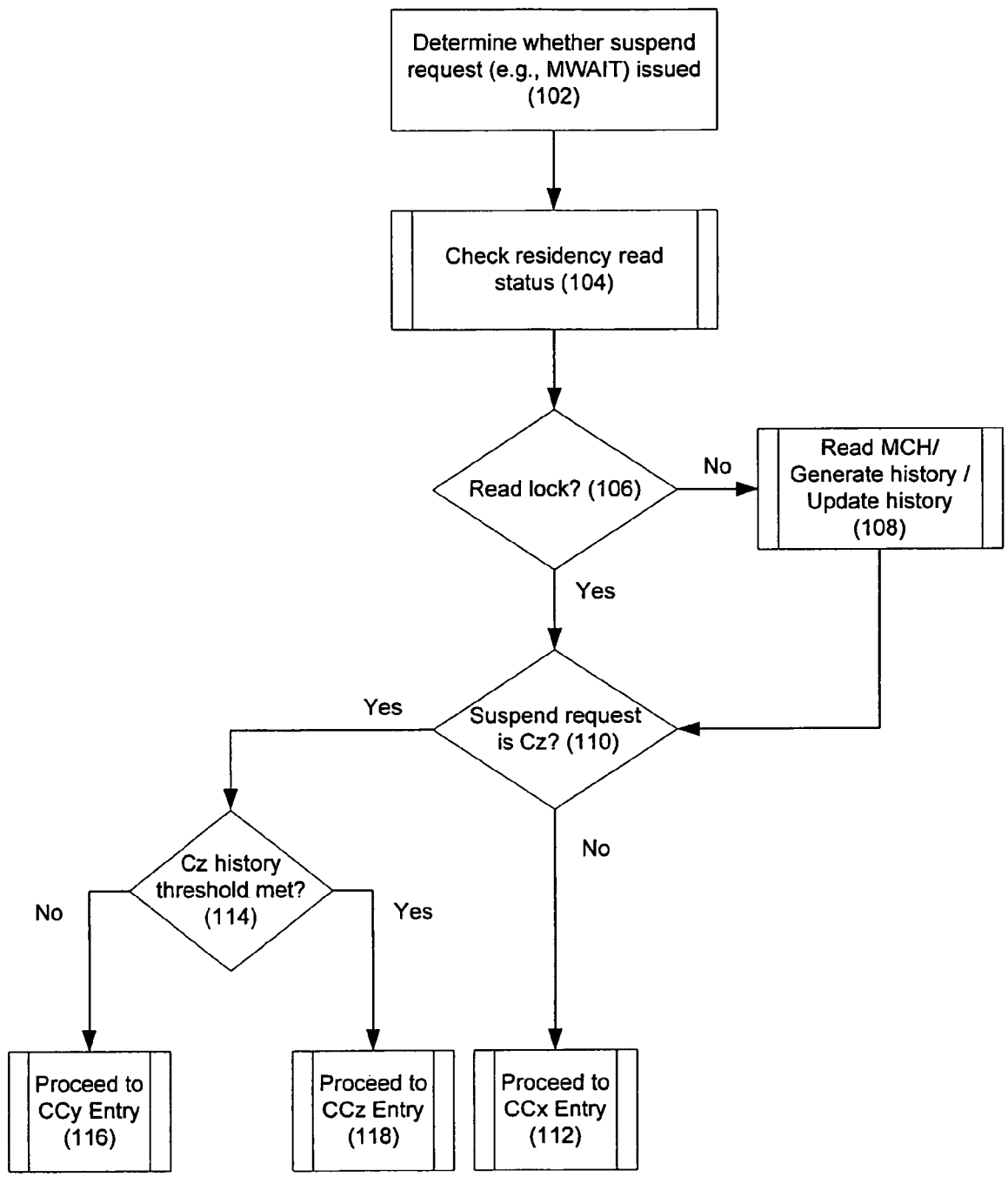
FIG. 1A is a flowchart of a power state optimization policy according to some embodiments of the invention.

According to some embodiments of the invention, deeper power states, also known as C-states, such as C5 or C6 may have a high energy cost for the transitions to and from them. The power states are discussed in additional detail below with respect to the states discussed by Advanced Configuration and Power Interface (ACPI) specification (for example, ACPI Specification, Rev. 3.0, Sept. 2, 2004; Rev. 2.0c, Aug. 25, 2003; Rev. 2.0, Jul. 27, 2000, etc.). This cost may become more significant as residency times, that is, the amount of time spent in a particular power state, shrink due to high interrupt rates of real-time needs of the system or similar requirements.

For example, when a real-time and/or streaming multimedia application is run on a system, it may request the system (or operating system) to reduce the interrupt interval to as low as 1 millisecond (ms) from what may by a typical, and still short interval, of about 15 ms. As one of ordinary skill in the relevant art would appreciated based at least on the teachings provided herein, the application of the embodiments of the invention is not limited to instances where the interrupt rates are between or in the realm of 1-15 ms. Indeed, some embodiments of the invention may provide advantages for other rates as well, as one of ordinary skill in the relevant art would appreciated based at least on the teachings provided herein.

The selection of a power state that does not take into consideration the energy costs of transitioning to and/or from those states may result in a reduction in operational life, e.g., battery life, of the system. Currently, the ACPI specification does not have a notion of the energy cost of power state transitions. The operating system makes its decision primarily based on latency and power of the power state. Latency is not always an accurate approximation for "energy" cost. For example, it may take the same 200 microseconds (μs) to enter two different power states, but it could cost more energy depending on which power state is entered. The problem may be amplified significantly when there are higher frequencies (greater numbers) of transitions.

According to some embodiments of the invention, this lack of consideration for the energy costs creates a need to make new power state policies. Furthermore, the ACPI specification, as well as the system or its operating system (OS), may need to be made energy-aware. In some embodiments of the invention, the system may need to have the optimum power state enforced on it. For legacy systems and operating systems, an energy-aware power state policy according to some embodiments of the invention may be needed to take advantage of the deeper power states, such as, but not limited to C5 or C6.

Specifically, some embodiments of the invention may include an apparatus and method for dynamically choosing an optimum power state. In some embodiments, the optimum power state may be determined from historical information about the various power states that any of the embodiments of the apparatus or a system equipped with embodiments of the apparatus or operating embodiments of the method may encounter. Some embodiments may generate registers to maintain information regarding the various power states. In some embodiments, power management logic may determine the optimum power state based upon this information.

FIG. 1A is a flowchart of a power state optimization policy 100A according to some embodiments of the invention. In some embodiments, the optimization policy process begins at 102, where it may determine whether a suspend request has issued. The suspend request may be an MWAIT, according to some embodiments of the invention, where the MWAIT is a command (IA32 instruction) that requests the processor/thread/logical processor (and its resources) enter a low power and/or sleep state. This command may need to be executed by each core/thread separately so that the corresponding processor enters the requested power state, according to some embodiments of the invention.

It is noted, as one of ordinary skill in the relevant art would appreciate, that the processor or core of the processor may not enter the requested power state, as the MWAIT is a request (or hint) that the OS will not require the processor and its resources for a certain amount of time. The process then proceeds to 104, where it may check a residency read status, according to some embodiments of the invention. The residency read status may be provided by a control register (CR) or policy register (PR), in some embodiments. Furthermore, the residency read status informs the process of a read lock, in 106. At 106, the process may determine if there is a read lock. If there is no read lock, then in some embodiments the process proceeds to 108, where it reads the memory controller hub (MCH) for information regarding the state of the processor. In some embodiments, the process may also generate a history and/or update the history for the power state in a power state residence history register, described in additional detail below. Upon completion of the operations at 108, a read lock may be set to establish an appropriate residency read status in the event the process 100A is repeated in whole or in part.

After the process completes the operations at 108, or if there is a read lock set, the process proceeds to 110, where it may determine which suspend request is being made, according to some embodiments of the invention. In some embodiments, the suspend request may be a C4, C5, or C6 state, or some other power state within or outside of the ACPI specification. In some embodiments, more than one power state may be tracked by the registers of the embodiments of the invention, and thus, the process at 110 may best be understood as a determination of the type (Cz) of suspend request being issued.

Upon determining the power state requested, the process may then proceed as follows:

In the event that the power state requested is not one for which a history is maintained, generated, or updated, such as a Cx or CCx (core Cx) state, the process may then proceed to 112, where it may proceed to enter the Cx or CCx state, according to some embodiments of the invention.

In the event that the power state requested is one for which a history is maintained, generated, or updated, such as a Cz or CCz state, the process may then proceed to 114, where it may determine if a Cz history threshold is met, according to some embodiments of the invention. It is noted that the history threshold is described in additional detail below.

In some embodiments, the process will, upon determining the history threshold, proceed as follows:

In the event that the power state requested has a history which indicates that it would be more efficient to proceed to a different power state rather than the requested power state, then the process may then proceed to 116, where, according to some embodiments of the invention, it may proceed to enter a Cy or CCy state.

In the event that the power state requested has a history which indicates that it would be more efficient to proceed to the requested power state rather than another power state, then the process may then proceed to 118, where it may proceed to enter the Cz or a CCz state, according to some embodiments of the invention.

Figure 1B:
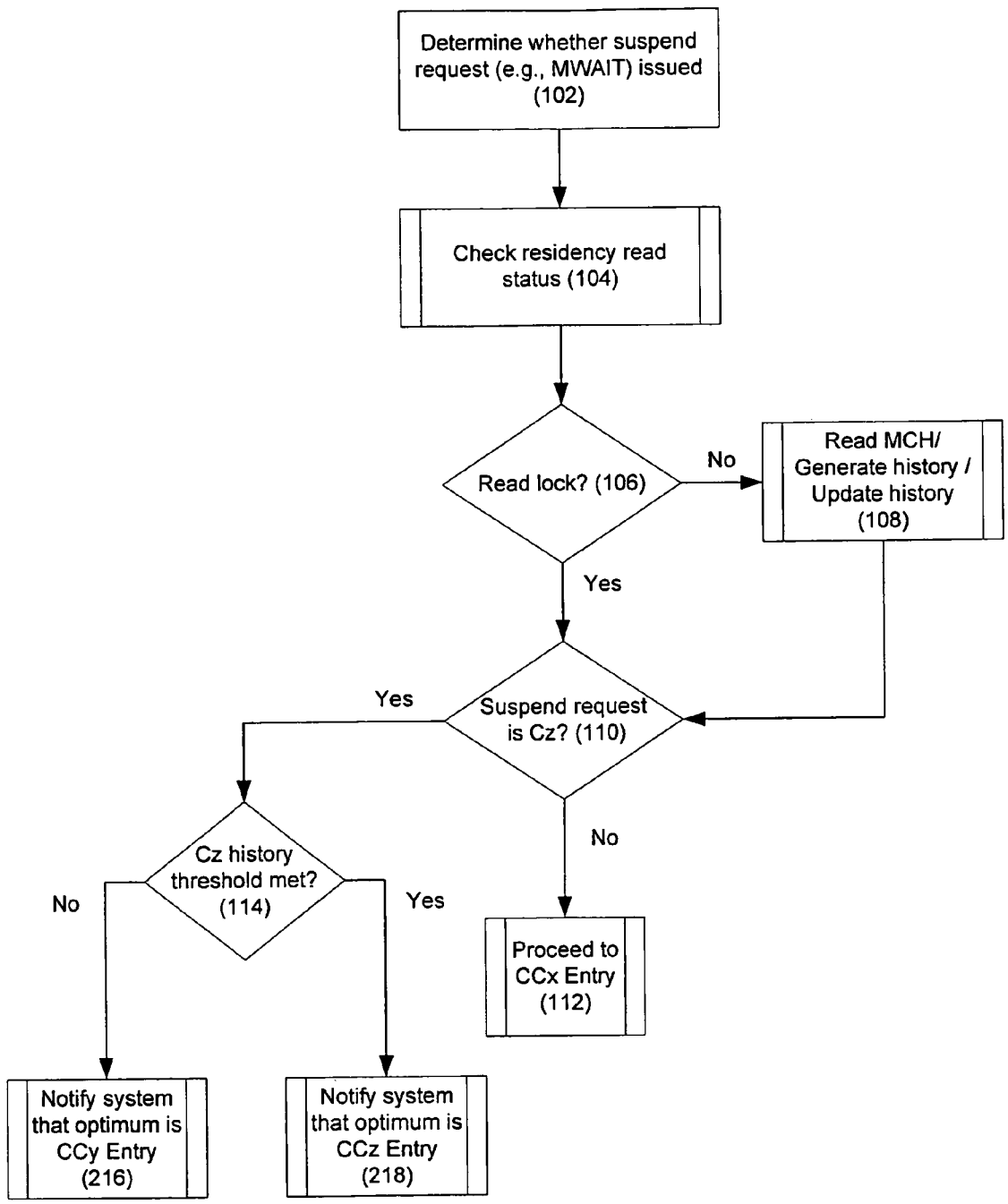
FIG. 1B is a flowchart of a power state optimization policy according to some embodiments of the invention.

FIG. 1B is a flowchart of a power state optimization policy 100B according to some embodiments of the invention. In 100B, the process may proceed much as in 100A, with the difference at 116 and 118, where new operations 216 and 218 may be added, in some embodiments. Specifically, operations 216 and 218 may be added in addition to 116 and 118, as they are not exclusive in any way.

As such, at 216, the process may notify the system or OS that the optimum power state is the Cy or CCy state, according to some embodiments of the invention. At 218, the process may notify the system or OS that the optimum power state is the Cz or CCz state, according to some embodiments of the invention.

As mentioned above, additional details of the registers and their variables are presently described. In some embodiments of the invention, a power state residency counter is provided in the MCH for each processing core of the system, such as, but not limited to, a dual core CPU package. In some embodiments, the power state residency counter includes a policy configuration control register in the MCH. The register may have two fields, according to some embodiments:

The last entered power state may be entered into a field that may record the last power state (e.g., C2 and higher, if using the ACPI specification) that the package entered successfully. In some embodiments, this field may contain a direct encoding of the power states: C2 may be 0010 . . . C6 may be 0110.

The time in residence at the last power state may be entered into a field that may record how long the package was in a specific power state, according to some embodiments of the invention. The value in this field may be cleared to 0 on entry to any other power state, in some embodiments. Moreover, the field may count during the residence and only stop on exit to C0, according to some embodiments of the invention. In some embodiments, the counter may continue to count during times when the package/system reaches another power state between the present state and C0 (or a non-rest state), e.g., during periods of time in a C2 state.

According to some embodiments of the invention, the logic of embodiments of the invention may access the power state policy register by doing a 4 byte IO read, as one of ordinary skill in the relevant art would appreciate. In some embodiments of the invention, the logic may implement a configuration machine specific register (MSR) as shown below in table 1.

TABLE 1

Power State Policy Configuration Control Register

| 31 | 19 18 | 11 10 | 8 7 | 0 |
|---|---|---|---|---|
| Reserved | Power State Threshold | Power State History Depth | Power State Minimum Residence | |

According to some embodiments of the invention, the power state policy configuration control register may be implemented in software and/or microcode, and may be a read-write MSR. In some embodiments, it may be initialized by BIOS. Moreover, in some embodiments, all of the fields in this register may be initialized at reset by the hardware of the system.

According to some embodiments of the invention, the field 'Power State Minimum Residence' may contain the power state minimum residence in 128 microsecond units. In some embodiments, the value in this field may be expected to be around 3 ms. Moreover, in some embodiments of the invention, the 'Power State History Depth' may define the history depth as described in table 2. In some embodiments, the depth may be programmed from 2 through 255.

TABLE 2

Power State Policy Configuration

| BITS 10:8 | HISTORY DEPTH | TICK SIZE | SATURATION | MAX THRESHOLD |
|---|---|---|---|---|
| 000 | 2 | 128 | 11111111 | 255 |
| 001 | 4 | 64 | 11111111 | 255 |
| 010 | 8 | 32 | 11111111 | 255 |
| 011 | 16 | 16 | 11111111 | 255 |
| 100 | 32 | 8 | 11111111 | 255 |
| 101 | 64 | 4 | 11111111 | 255 |
| 110 | 128 | 2 | 11111111 | 255 |
| 111 | 255 | 1 | 11111111 | 255 |

According to some embodiments of the invention, the 'Power State Threshold' may define the threshold on a scale from 0 to 255 for a specific power state, such as C6, to be demoted to another power state, such as C4. In some embodiments, the value in this field may be programmed independently of the power state history depth.

In some embodiments of the invention, the logic may implement a power state residence history MSR as shown below in table 3.

TABLE 3

Power State Residence History Register

| 31 | 16 | 15 | 8 | 7 | 2 | 1 | 0 |
|---|---|---|---|---|---|---|---|
| Reserved | | Power State History | | Reserved | | Read Lock Clear | Read Lock |

According to some embodiments of the invention, the power state residence history register may be implemented in software and/or microcode, and may be a read-write MSR. In some embodiments, it may be initialized by BIOS. Moreover, in some embodiments, all of the fields in this register may be cleared to 0 at reset by the hardware of the system.

In some embodiments, the 'Power State History' may be read and written by microcode. Furthermore, in some embodiments, it may contain the history of power states whose residence was equal or higher than the power state minimum residence for each specific power state specified and defined in the power state policy configuration control register (see table 1).

According to some embodiments of the invention, the 'Read Lock Clear' may be read and written by microcode. Moreover, it may be used to clear read locks during policy operations of the processes described herein.

In some embodiments, the 'Read Lock' may be used by the hardware to inform the microcode that it may read the power state residence history register in the MCH. According to some embodiments of the invention, a zero (0) in this field may mean the microcode can read the MCH register. Similarly, in some embodiments, a one (1) in this field may mean the latest power state information has already been read from the MCH, and the microcode should not read the MCH. In some embodiments, this is a read-only field for microcode.

Figure 2:
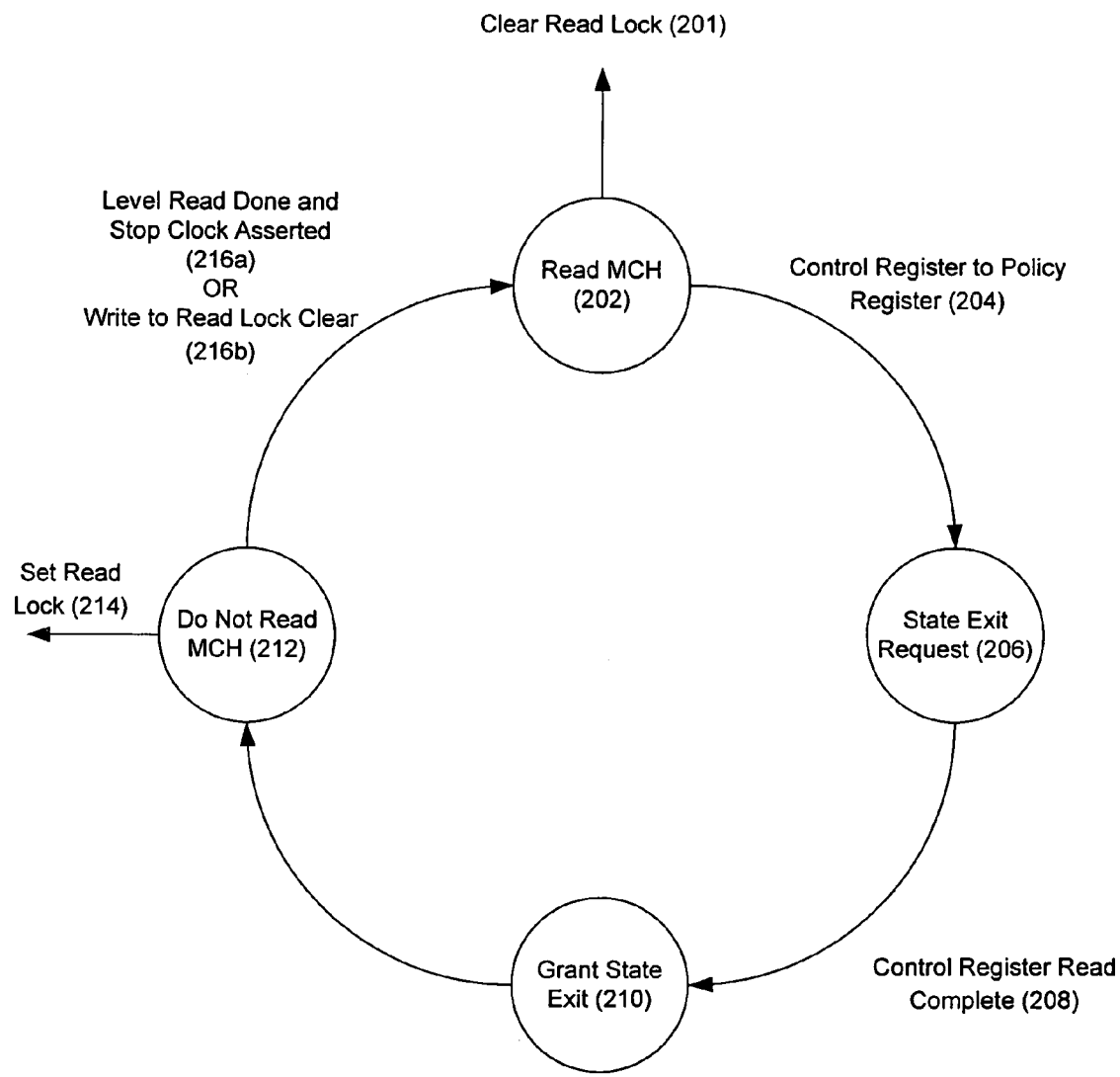
FIG. 2 is a finite state machine supporting power state residency readings according to some embodiments of the invention.

FIG. 2 is a finite state machine 200 supporting power state residency readings according to some embodiments of the invention. In some embodiments of the invention, the logic may implement a scheme to ensure that the power state residence information is read only once on every package power state exit for the package power state, such as, but not limited to, C2 and above. Of concern, in some embodiments, in the absence of a mechanism to prevent multiple reads, the power state history may get biased towards the last power state residence. Thus, in some embodiments, the 'read lock' may be employed. This may be done either by using a hardware finite state machine (FSM) or a semaphore mechanism, in some embodiments.

In FIG. 2, the FSM may read the MCH at 202 and proceed to a state exit request at 206, in some embodiments. A CR may be used by the MCH to read a PR, such as the registers described above. Once the CR has completed the read at 208, the FSM proceeds to 210, where it may grant an exit state, according to some embodiments of the present invention. The FSM 200 may proceed, in some embodiments, to 212, where it does not allow for the reading by setting the read lock at 214. Alternatively, in some embodiments, the FSM 200 may complete a level read and assert a stop clock (216a) or write to the read lock clear field (216b), and proceed back to 202. In the former (216a), the FSM 200 may proceed to clear the read lock at 201, according to some embodiments of the invention.

As described above, in some embodiments, the FSM 200 may control the lock bit in the power state residence history register bit 0. In some embodiments, this bit may be set when the microcode reads the power state residence history register. Accordingly, when the bit is not already cleared, the bit may be cleared when the package is ready to enter C2 or above, according to some embodiments of the invention.

For example, according to some embodiments, the first core that will execute MWAIT C2+ after a package exits from C2+ state may be able to read the MCH Power State Residence register and update the power state history register. Thereafter, in some embodiments, any core that may read the history register after the first read will see the read lock bit set to 1 and may not read the MCH power state residence. The next read to MCH may happen on exit from C2+ state, in some embodiments, when a new residence value is available in the MCH.

In some embodiments, the history register read may cause the lock bit to set, even if it was only read for debugging purposes. In some embodiments, the logic may work around this by use of the read lock clear. For example, the lock bit may be cleared on write pulse to read lock bit with a value of 1, in some embodiments of the invention.

As described above with respect to FIGS. 1A and 1B, the discussion of the microcode, according to some embodiments of the invention, illustrates that it may read the MCH power state residence register at the beginning of a MWAIT C2+ or IO redirection to C2+. In some embodiments, it may use the lock to determine whether the read can be done. Moreover, in some embodiments, the read lock clear bit may be a 0 during microcode read/write operations. The flowcharts of FIGS. 1A and 1B illustrate this read and policy microcode according to some embodiments of the invention.

Figure 3:
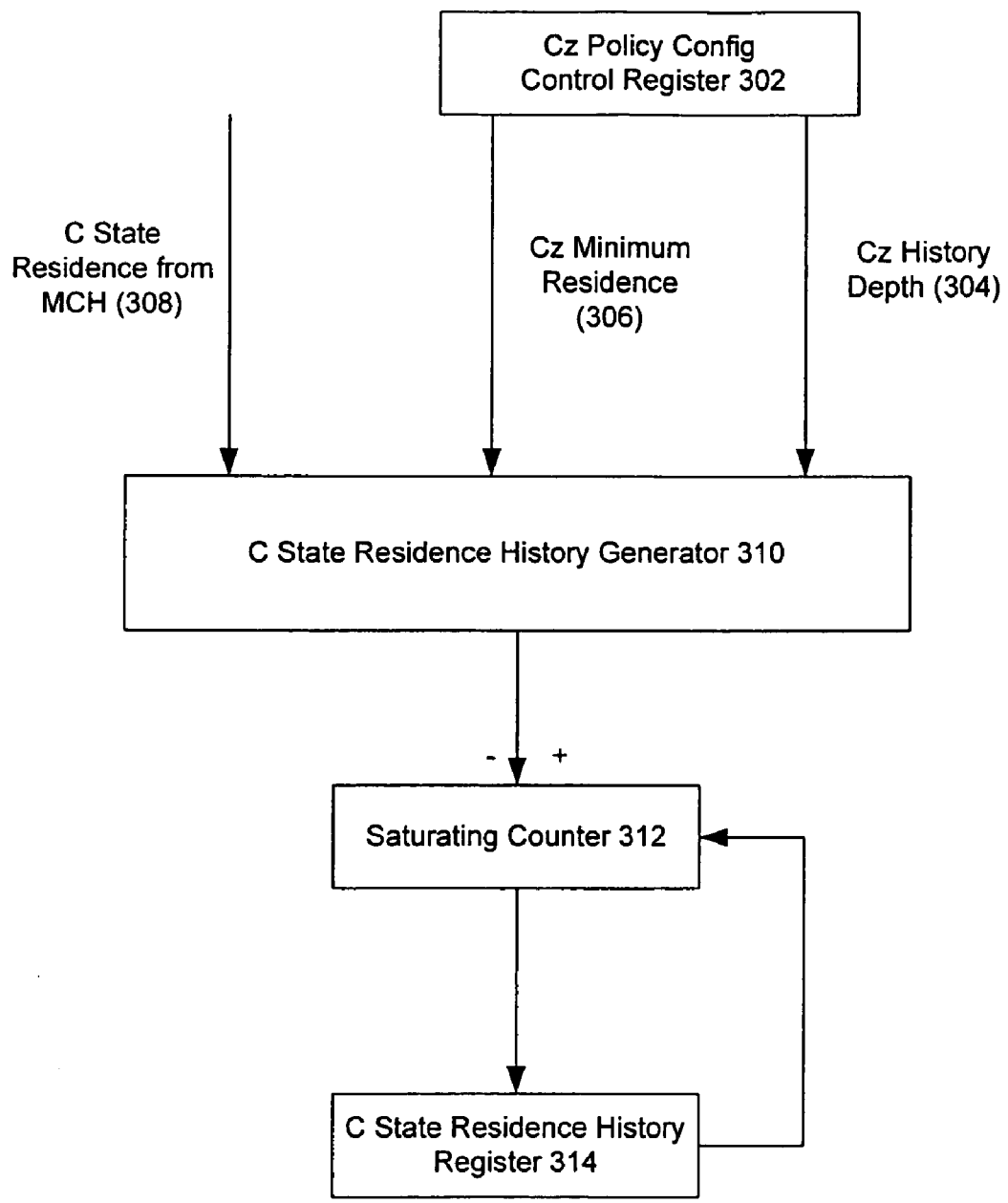
FIG. 3 is block diagram of power state residency history logic according to some embodiments of the invention.

FIG. 3 is block diagram of power state residency history logic according to some embodiments of the invention. In some embodiments, the logic may generate the registers from the operation of the one or more cores of the system. The logic may be implemented in hardware, software or firmware, according to some embodiments of the invention, and may be stored and/or operated from power management logic 150, power management state control logic 442, a microcode 123, or an OS 445, all shown in FIG. 4, which is described below.

In some embodiments, the microcode may implement the power state residence history generator as shown in FIG. 3. According to some embodiments of the invention, it may read the power state policy configuration control register 302 to get the power state history depth 304 and power state minimum residence 306, as well as, from the MCH, the last package power state residence 308. In some embodiments, the power state residence history generator 310 may compare the residence value with the other values, and based at least on the comparison, the microcode may increment or decrement the saturating counter 312 and write it back to the power state residence history register 314.

According to some embodiments of the invention, the tick size for increment and decrement may be based on the Power State History depth field in the Power State Policy Configuration Control Register as shown in Tables 1 and 2. In some embodiments, if the last residence value is greater than or equal to the power state minimum residence, then the tick value may be added to the history. In some embodiments, if the last residence value is greater than or equal to the power state minimum residence, then the tick value may be subtracted from the history. In some embodiments, the counter may saturate to 0 and FF and will not overflow. It is important to note that these are embodiments of the invention and not meant to imply that saturation can only happen in one direction. Furthermore, in some embodiments of the invention, subtraction may happen if the last residence value is less than the power state minimum residence.

According to some embodiments of the invention, the power state may be demoted or otherwise altered, as described in FIGS. 1A and 1B, such as, but not limited to, a C6 demotion. For example, the power state entry microcode may read the residence history before it makes a decision to enter the C6 state. It may use the history to make a decision whether the requested C6 state needs to be demoted to CC4, according to some embodiments of the invention: If the history value is equal to or greater than the C6 threshold field in the C6 Policy Configuration Control register, then the core may enter CC6; if the history value is smaller, the core may enter CC4.

According to some embodiments of the invention, the optimization or improvement, such as by reducing the amount of time required, to enter and exit power states may be extremely useful for manufacturers, users and programmers. Some embodiments of the invention may be applied to other power management features, such as, but not limited to, power state configurations for machines, peripherals, etc.

As described elsewhere herein, some embodiments of the invention may be implemented in one or a combination of hardware, firmware, and software. Some embodiments of the invention may also be implemented in whole or in part as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 4:
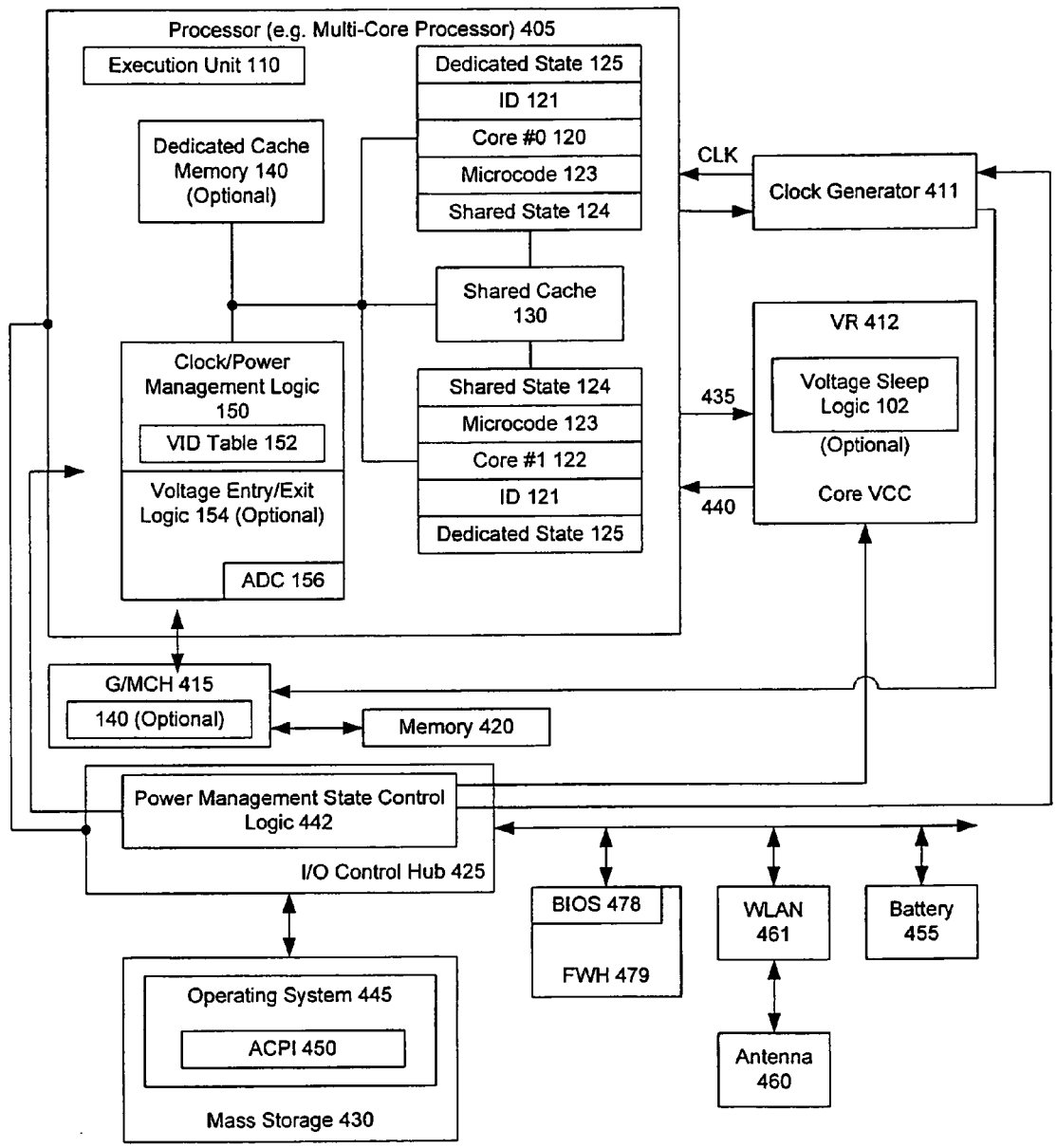
FIG. 4 is a block diagram of an apparatus and system according to some embodiments of the invention.

FIG. 4 is a block diagram of an apparatus and system 400 according to some embodiments of the invention. The system 400 may be a notebook or laptop computer system, or may be any different type of mobile electronic system such as a mobile device, personal digital assistant, wireless telephone/handset or may even be a non-mobile system such as a desktop or enterprise computing system. Other types of electronic systems are also within the scope of various embodiments.

The system 400 includes a processor 405, e.g., a multi-core processor, a platform-level clock generator 411, a voltage regulator 412 coupled to the processor 405, a memory control hub 415 coupled to the processor 405 over a bus 417, a memory 420 which may comprise one or more of random access memory (RAM), flash memory and/or another type of memory, an input/output (I/O) control hub 425 coupled to the memory control hub 415 over a bus 427, and a mass storage device 430 coupled to the I/O control hub 425 over a bus 432. Although, system 400, in some embodiments, may be a mobile device with the subsystems described, it should be appreciated that system 400 may be a different type of mobile device or a non-mobile device, with more or less than the subsystems described.

In some embodiments of the invention, the processor 405 may be an Intel® architecture microprocessor such as, for example, a follow-on processor to the Intel Pentium® M processor including one or more processing cores (e.g. 120 and 122) and at least one execution unit 110 to process instructions. For some embodiments of the invention, the processor 405 may include Intel SpeedStep® technology or another power management-related technology that provides for two or more voltage/frequency operating points. An associated clock/power management unit 150 may be included in the processor 405 to control transitions between two or more of the voltage/frequency pairs.

In some embodiments of the invention, the processor 405 may be a different type of processor such as a digital signal processor, an embedded processor, or a microprocessor from a different source.

Optionally, processor 405 may include a dedicated cache memory 140 (e.g. synchronous random access memory (SRAM)) that may be used to store the processor's state variables and power state information. In some embodiments of the invention, the memory 140 may store some or all of this information when the processor enters a very low voltage state, such as, but not limited to the zero-voltage sleep state. In some embodiments of the invention, memories may be built into the processor's chip or packaged within the same housing as the processor chip.

Where Intel SpeedStep® technology or another type of power management technology is included on the processor 405, the available voltage/frequency pairs associated with the technology include a minimum voltage/frequency pair corresponding to a minimum active mode operating voltage and a minimum operating frequency associated with the processor 405 for a fully functional operational mode. These may be referred to herein as the minimum operating voltage and minimum operating frequency or minimum active mode operating voltage and frequency, respectively. Similarly, a maximum operating voltage and frequency may be defined. Other available voltage frequency pairs may be referred to as operating voltage/frequency pairs or simply other voltage/frequency or frequency/voltage pairs.

Optionally, zero voltage entry/exit logic 154 may also be included in processor 405, either within or outside of the power management logic (PML) 150, to control entry into and exit from the zero, near zero, or voltage sleep state, also referred to herein as the C6 state. As is described elsewhere herein, the PML 150 may include the logic of embodiments of the invention.

A voltage identification (VID) memory 152 that is accessible by the zero voltage entry/exit logic 154 may be included to store a voltage identification code look-up table. The VID memory may be an on-chip or off-chip register or another type of memory, and the VID data may be loaded into the memory via software, basic input/output system (BIOS) code 478 (which may be stored on a firmware hub 479 or in another memory), an operating system, other firmware and/or may be hardcoded, for example. Alternatively, a software look-up table including VID and related data may be otherwise accessible by the logic 150. The VID information may also be stored on the CPU as fuses (e.g., programmable ROMs (PROMs)).

In some embodiments of the invention, the information required for the operation of the logic of FIGS. 1A and 1B and/or the registers described above may be similarly stored along with the VID data.

An analog-to-digital converter (ADC) 156 may also be provided as part of the zero voltage entry/exit logic 150 to monitor a voltage supply level and provide an associated digital output as described in more detail below.

Voltage regulator 412 provides a supply operating voltage to the processor 405 and may be in accordance with a version of the Intel Mobile Voltage Positioning (IMVP) specification such as the IMVP-6 specification, for example. For such embodiments, the voltage regulator 412 is coupled to receive VID signals from the processor 405 over a bus 435 and, responsive to the VID signals, provides an associated operating voltage to the processor 405 over a signal line 440. The voltage regulator 412 may include voltage sleep logic 102 that is responsive to one or more signals to reduce voltage 440 to the processor 405 to a zero state and then ramp the voltage to the processor back up again after exiting the zero voltage sleep state.

For other embodiments of the invention, a different type of voltage regulator may be used, including a voltage regulator in accordance with a different specification. Further, for some embodiments, the voltage regulator may be integrated with another component of the system 400 including the processor 405. It should be appreciated that the voltage regulator may or may not be integrated with the CPU dependent upon design considerations.

The memory control hub 415 may include both graphics and memory control capabilities and may alternatively be referred to herein as a graphics and memory control hub (G/MCH) or a North bridge. The graphics and memory control hub 415 and the I/O control hub 425 (which also may be referred to as a South bridge) may be collectively referred to as the chipset. For other embodiments, chipset features may be partitioned in a different manner and/or may be implemented using a different number of integrated circuit chips. For example, for some embodiments, graphics and memory control capabilities may be provided using separate integrated circuit devices.

The I/O control hub 425 of some embodiments includes power management state control logic 442, alternatively referred to herein as C-state control logic. The power management state control logic 442 may control aspects of the transitions between some power management and/or normal operational states associated with the processor 405, either autonomously or in response to operating system or other software or hardware events. For example, for Intel® architecture processors for which at least active mode and power management states referred to as C0, C1, C2 and C4, C5 and C6 are supported, the power management state control logic 442 may at least partially control transitions between at least a subset of these states using one or more of a stop clock (STPCLK#), processor sleep (SLP#), deep sleep (DPSLP#), deeper stop (DPRSTP#), and/or stop processor (STPCPU#) signals.

Also, in some embodiments of the invention, voltage from the I/O control hub 425 (VI/O 149) may be provided to the processor 405 in order to provide sufficient power to the dedicated cache memory 140 such that it can store the state variables associated with the processor 405 while the rest of the processor 405 is powered down by the reduction of the operating voltage 440 down to a zero state.

For other types of architectures and/or for processors that support different power management and/or normal operational states, the power management state control logic 442 may control transitions between two or more different power management and/or normal operational states using one or more signals that may be similar to or different from the signals described herein.

The mass storage device 430 may include one or more compact disc read-only memory (CD-ROM) drive(s) and associated disc(s), one or more hard drive(s) and associated disk(s) and/or one or more mass storage devices accessible by the computing system 400 over a network. Other types of mass storage devices such as, for example, optical drives and associated media, are within the scope of various embodiments.

For some embodiments, the mass storage device 430 stores an operating system 445 that includes code 450 to support a current and/or a follow-on version of the ACPI specification, which is discussed elsewhere herein. ACPI may be used to control some aspects of power management as described in more detail below. The operating system 445 may be a Windows™ or another type of operating system available from Microsoft® Corporation of Redmond, Wash. Alternatively, a different type of operating system such as, for example, a Linux™ operating system, and/or a different type of operating system-based power management may be used for other embodiments. Further, the power management functions and capabilities described herein as being associated with ACPI may be provided by different software or hardware.

Also, it should be appreciated that system 400 may include a display device, such as a cathode ray tube (CRT) or liquid crystal display (LCD), for displaying information to a user. Further, system 400 may include an alphanumeric input device (e.g., a keyboard), including alphanumeric and other keys, for communicating information and command selections to processor 405. An additional user input device may be cursor control device, such as a mouse, trackball, trackpad, stylus, or cursor direction keys, for communicating direction information and command selections to processor 405, and for controlling cursor movement on the display device.

Another device that may included with system is a hard copy device, which may be used for printing instructions, data, or other information on a medium such as paper, film, or similar types of media. Furthermore, a sound recording and playback device, such as a speaker and/or microphone (not shown) may optionally be included in system 400 for audio interfacing.

Where the system 400 is a mobile or portable system, a battery or battery connector 455 may be included to provide power to operate the system 400 either exclusively or in the absence of another type of power source. Additionally, for some embodiments, an antenna 460 may be included and coupled to the system 400 via, for example, a wireless local area network (WLAN) device 461 to provide for wireless connectivity for the system 400.

WLAN device 461 may include a wireless communication module that may employ a Wireless Application Protocol (WAP) to establish a wireless communication channel. The wireless communication module may implement a wireless networking standard such as Institute of Electrical and Electronics Engineers (IEEE) 802.11 standard, IEEE std. 802.11-1999, published 1999.

It should be appreciated that, in some embodiments of the invention, the processor 405 of FIG. 4 may transition between various known C-states. The normal operational state or active mode for the processor 405 is the C0 state in which the processor actively processes instructions. In the C0 state, the processor 405 is in a high-frequency mode (HFM) in which the voltage/frequency setting may be provided by the maximum voltage/frequency pair.

In order to conserve power and/or reduce thermal load, for example, the processor 405 may be transitioned to a lower power state whenever possible. For example, from the C0 state, in response to firmware, such as microcode, or software, such as the operating system 445, or even ACPI software in some cases, executing a HALT or MWAIT instruction (not shown), the processor 405 may transition to the C1 or Auto-HALT state. In the C1 state, portions of the processor 405 circuitry may be powered down and local clocks may be gated.

The processor may transition into the C2 state, also referred to as the stop grant or SLEEP state, upon assertion of the STPCLK# or similar signal by the I/O controller 425, for example. The I/O controller 425 may assert the STPCLK# signal in response to the operating system 445 determining that a lower power mode may be or should be entered and indicating this via ACPI software 450. In particular, one or more ACPI registers (not shown) may be included in the I/O controller 425 and the ACPI software 450 may write to these registers to control at least some transitions between states. During operation in the C2 state, portions of the processor 405 circuitry may be powered down and internal and external core clocks may be gated. For some embodiments, the processor may transition directly from the C0 state into the C2 state.

Similarly, the processor 405 may transition into the C3 state, also referred to as the Deep Sleep state, in response to the I/O controller 425 or other chipset feature asserting a CPUSLP# signal and then a DPSLP# signal or other similar signals. In the Deep Sleep state, in addition to powering down internal processor circuitry, all phase-lock loops (PLLs) in the processor 405 may be disabled. Further, for some embodiments, a STOP$_{13}$ CPU signal may be asserted by the input/output controller 425 and received by the clock generator 411 to cause the clock generator to halt the clock signal CLK to the CPU 405.

In the system 400, a transition into the C4 state or into a zero voltage sleep state may be undertaken in response to ACPI software 450 detecting that there are no pending processor interrupts, for example. ACPI software may do this by causing the ICH 425 to assert one or more power management-related signals such as the exemplary Deeper Stop (DPRSTP#) signal and the exemplary DPSLP# signal. The Deeper Stop (DPRSTP#) signal is provided directly from the chipset to the processor and causes clock/power management logic 450 on the processor to initiate a low frequency mode (LFM). For the low frequency mode, the processor may transition to the minimum or another low operating frequency, for example.

According to some embodiments of the invention, assertion of the DPRSTP# signal may further cause the internal VID target to be set to a zero voltage level, resulting in a zero operational voltage being applied to the processor 405 by the voltage regulator 412, such that the processor transitions into a very deep sleep state that has very low power consumption characteristics.

According to some embodiments of the invention, an integrated circuit such as processor 405, for example, may initiate a transition to a zero voltage power management state. In one example, processor 405 may be a central processing unit (CPU) 405. Further, the zero voltage management state may be, for example, a deeper sleep state in accordance with ACPI standards. During this transition, the state of the CPU 405 may be saved. For example, state variables associated with the CPU 405 may be saved in dedicated cache memory (e.g. SRAM) 140.

The operating voltage of the CPU 405 may be subsequently reduced to zero such that the CPU 405 is in a very deep sleep state that has very low power consumption characteristics. Particularly, the voltage regulator 412 utilizing optional zero voltage sleep state logic 102 may reduce the operating voltage 440 down to zero. As previously discussed, this may be done in conjunction with zero voltage entry/exit logic 154 of clock/power management logic 150 of CPU 405. In some embodiments, this zero voltage power management state, when implemented in conjunction with ACPI standards, may be referred to as the C6 state.

Subsequently, in response to receiving a request to exit the zero voltage power management state, the CPU 405 may exit the zero voltage power management state at a higher reference operating voltage. Particularly, under the control of zero voltage entry/exit logic 154 of CPU 405 and zero voltage sleep logic 102 of voltage regulator 412, as previously described, voltage regulator 412 may raise the reference operating voltage 440 to a suitable level such that the CPU 405 may operate properly. The critical state variables of CPU 405 are then restored from the dedicated cache memory 140.

Thus, according to some embodiments of the invention, the power management scheme allows the CPU 405 to save its state information, including the registers described herein, turn off the power and then wake up when necessary, restore the state, and continue where the CPU left off. This may be done, in some embodiments, without explicit support from the operating system 445, and may be accomplished with a shorter latency period, due in part to use of the optimization approaches of embodiments of the invention.

More particularly, in some embodiments of the invention, in the zero voltage processor sleep state, which may be referred to as a C6 state in accordance with ACPI standards, the state of the CPU 405 may be saved in dedicated sleep state SRAM cache 140, which may be powered off the I/O power supply (VI/O) 149, while the core operating voltage 440 for the CPU 405 is taken down to approximately 0 Volts. At this point, the CPU 405 is almost completely powered off and consumes very little power.

Upon an exit event, the CPU 405 may indicate to the voltage regulator 412 to ramp the operating voltage 440 back up (e.g. with a VID code 435), relocks the phase lock loop (PLLS) and turns the clocks back on via clock/power management logic 150 and zero voltage entry/exit logic 154. Further, CPU 405 may perform an internal RESET to clear states, and may then restore the state of the CPU 405 from the dedicated sleep state SRAM cache 140, and CPU 405 may continue from where it left off in the execution stream. These operations may be done in a very small time period (e.g., approximately 100 microseconds), in CPU 405 hardware, such that it is transparent to the operating system 445 and existing power management software infrastructure.

In some embodiments, this methodology is particularly suited for a CPU 405 having multiple processor cores. In this example, core 120 (e.g. Core #0) and core 122 (e.g. Core #1), i.e. a dual-core CPU, will be discussed as an example. However, it should be appreciated that any suitable number of CPU cores may be utilized. In the dual-core structure, the CPU cores 120 and 122 utilize a shared cache 130. For example, this shared cache 130 may be a level 2 (L2) cache 120 that is shared by the cores 120 and 122.

Further, each core 120 and 122 includes a core ID 121, microcode 123, a shared state 124, and a dedicated state 125. The microcode 123 of the cores 120 and 122 is utilized in performing the save/restore functions of the CPU state and for various data flows in the performance of the zero voltage processor sleep state in conjunction with the zero voltage entry/exit logic 154 of the clock/power management logic 150 of CPU 405. Further, dedicated sleep state SRAM cache 140 may be utilized to save the states of the cores, as well as the registers of embodiments of the invention.

It will be appreciated by one of ordinary skill in the relevant art, based at least on the teachings provided herein, that the system 400 and/or other systems of various embodiments may include other components or elements not shown in FIG. 4 and/or not all of the elements shown in FIG. 4 may be present in systems of all embodiments.

Furthermore, the logic of some embodiments may be implemented as a finite state machine (FSM) within one or more of the components of FIG. 4. One of ordinary skill in the art would appreciate, based at least on the teachings described herein, that such a FSM would operate in accordance with the flowcharts described below.

While many specifics of one or more embodiments have been described above, it will be appreciated that other approaches for optimizing the latency of dynamic memory sizing may be implemented for other embodiments. For example, while specific power states are mentioned above, for other embodiments, other power states and/or other power factors may be considered in determining that memory block contains modified or accessed data. Further, while a memory in a dual core processor in a personal computer is described above for purposes of example, it will be appreciated that an optimized latency approach for dynamic memory sizing, according to one or more embodiments of the invention, may be applied to a different type of memory and/or host integrated circuit chip and/or system.

Any reference in this specification to "one embodiment," "an embodiment," "some embodiments," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering or simultaneously, as one or ordinary skill would appreciate based at least on the teachings provided herein.

Embodiments of the present invention may be described in sufficient detail to enable those skilled in the art to practice the invention. Other embodiments may be utilized, and structural, logical, and intellectual changes may be made without departing from the scope of the present invention. Moreover, it is to be understood that various embodiments of the invention, although different, are not necessarily mutually exclusive. For example, a particular feature, structure, or characteristic described in one embodiment may be included within other embodiments. Accordingly, the detailed description is not to be taken in a limiting sense.

The foregoing embodiments and advantages are merely exemplary and are not to be construed as limiting the present invention. For instance, the present teaching can be readily applied to other types of memories. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
    a policy configuration control register to contain information regarding at least a first power state and includes at least one of a minimum residence time for the first power state, a history depth for the first power state, and a threshold for the first power state to be demoted to the second power state;
    a residence history register to contain information regarding at least the first power state;
    a power management logic to determine a suspend request for the first power state, wherein the power management logic to determine whether a history threshold is met for the first power state, and proceed to a second power state when the history threshold is not met.

2. The apparatus of claim 1, wherein, when the history threshold is met, the power management logic is to proceed to the first power state.

3. The apparatus of claim 2, wherein the power management logic is adapted to notify an operating system that the first power state is a more power efficient state.

4. The apparatus of claim 1, wherein the policy configuration control register includes information regarding more than one power state.

5. The apparatus of claim 1, wherein the residence history register includes information regarding more than one power state.

6. The apparatus of claim 1, wherein the power management logic is adapted to notify an operating system that the second power state is a more power efficient state.

7. The apparatus of claim 1, wherein the power management logic is adapted to maintain the minimum residence time, the history depth, and the threshold in the policy configuration control.

8. The apparatus of claim 1, wherein the residence history register further includes at least one of a power state history, wherein the power state history includes at least information on power states whose residence was equal to or higher than the first power state, setting for clearing a read lock, or a setting for the read lock, wherein the read lock may prevent a system from reading the residence history.

9. The apparatus of claim 8, wherein the power management logic is adapted to maintain the power state history, the setting for clearing the read lock, and the setting for the read lock in the residence history.

10. The apparatus of claim 1, wherein the power management logic is further adapted to determine whether a suspend request is to be issued, determine a residency history read status, wherein the read status may be locked or unlocked, when the read status is locked, proceed to the determining of the suspend request for the first power state, and when the read status is not locked, proceed to the reading of the policy configuration control.

11. The apparatus of claim 1, wherein the first power state or the second power state are sleep states.

12. A method comprising:
    reading a policy configuration control for at least a first power state;

reading a residence history for at least the first power state;
determining a suspend request for the first power state;
determining whether a history threshold is met for the first power state;
reading a minimum residence time for the first power state;
determining a history depth for the first power state;
determining a threshold for the first power state to be demoted to the second power state;
maintaining the minimum residence time, the history depth, and the threshold in the policy configuration control; and
proceeding to a second power state when the history threshold is not met.

13. The method of claim 12, further comprising: proceeding to the first power state when the history threshold is met.

14. The method of claim 13, wherein the proceeding to the first power state is preceded by notifying a system that the first power state is a more power efficient state.

15. The method of claim 12, wherein the policy configuration control is generated for more than one power state.

16. The method of claim 12, wherein the residence history is generated for more than one power state.

17. The method of claim 12, wherein the proceeding to a second power state is preceded by notifying a system that the second power state is a more power efficient state.

18. The method of claim 12, further comprising: reading a power state history, wherein the power state history includes at least information on power states whose residence was equal to or higher than the first power state; reading a setting for clearing a read lock; reading a setting for the read lock, wherein the read lock may prevent a system from reading the residence history; and maintaining the power state history, the setting for clearing the read lock, and the setting for the read lock in the residence history.

19. The method of claim 12, further comprising: determining whether a suspend request is to be issued; determining a residency history read status, wherein the read status may be locked or unlocked; when the read status is locked, proceeding to the determining of the suspend request for the first power state; and when the read status is not locked, proceeding to the reading of the policy configuration control.

20. The method of claim 12, wherein the first power state or the second power state are sleep states.

21. A system comprising:
a firmware hub to provide access to one or more configuration settings for the system, wherein the one or more configuration settings includes one or more power state settings available to the system;
a policy configuration control register to contain information regarding at least a first power state and includes at least one of a minimum residence time for the first power state, a history depth for the first power state, and a threshold for the first power state to be demoted to the second power state;
a residence history register to contain information regarding at least the first power state;
a power management logic to determine a suspend request for the first power state, wherein the power management logic to determine whether a history threshold is met for the first power state, and proceed to a second power state when the history threshold is not met.

22. The system of claim 21, further comprising: a wireless local area network module to provide the system with access to one or more networks.

23. A machine-readable storage medium having stored thereon instructions, which when executed by a machine, cause the machine to perform operations comprising:
reading a policy configuration control for at least a first power state;
reading a residence history for at least the first power state;
determining a suspend request for the first power state;
determining whether a history threshold is met for the first power state;
reading a minimum residence time for the first power state;
determining a history depth for the first power state;
determining a threshold for the first power state to be demoted to the second power state;
maintaining the minimum residence time, the history depth, and the threshold in the policy configuration control; and
proceeding to a second power state when the history threshold is not met.

* * * * *